United States Patent [19]

Fujita et al.

[11] Patent Number: 4,585,486

[45] Date of Patent: Apr. 29, 1986

[54] PROCESS FOR PLACING CEMENT COMPOSITION HAVING HIGH STRENGTH

[75] Inventors: Keiichi Fujita, Tokyo; Hiroshi Nakauchi; Tatsuo Kita, both of Ichikawa; Yoshiki Nakagawa; Terunobu Maeda, both of Urawa, all of Japan

[73] Assignee: Hazama-Gumi, Ltd., Tokyo, Japan

[21] Appl. No.: 629,305

[22] Filed: Jul. 10, 1984

[51] Int. Cl.$^4$ .............................................. C04B 21/00
[52] U.S. Cl. ........................................ 106/86; 106/93; 106/314; 106/90; 264/42; 264/333
[58] Field of Search ................... 106/90, 93, 314, 315, 106/86; 55/55; 264/333, 42

[56] References Cited

U.S. PATENT DOCUMENTS

| | | | |
|---|---|---|---|
| 2,485,857 | 10/1949 | Bower | 55/55 |
| 4,118,241 | 10/1978 | Bernett | 106/90 |
| 4,188,231 | 2/1980 | Valore | 106/93 |
| 4,365,977 | 12/1982 | Egbert | 55/55 |
| 4,462,837 | 7/1984 | Baker et al. | 106/93 |

Primary Examiner—William R. Dixon, Jr.
Assistant Examiner—Steven Capella
Attorney, Agent, or Firm—Jordan and Hamburg

[57] ABSTRACT

A process for placing a cement composition having high strength is provided. The process comprises the steps of adding a viscosity increasing agent, vacuum de-bubbling under reduced pressure and allowing the de-bubbled cement composition to be hardened. At the vacuum de-bubbling step, relatively large foams present in the cement composition are removed and only fine bubbles are left in the composition. The strength of the cement composition is remarkably improved by the removal of large bubbles.

17 Claims, No Drawings

PROCESS FOR PLACING CEMENT COMPOSITION HAVING HIGH STRENGTH

BACKGROUND OF THE INVENTION

1. Field of the Invention

The present invention relates to a process for placing a cement composition, and more particularly to a process for placing a cement composition having high strength.

2. Prior Art

In the prior art processes, the strength of cement mortar or concrete has been improved by the addition of a variety of cement admixtures of by mixing a reinforcing material, such as fibers or rods of glass or steel. However, the tensile and bending strengths cannot be appreciably improved by the former-mentioned admixture addition method, whereas the reinforced cement composition obtained by the latter-mentioned method is disadvantageously expensive with extra labor and costs required for mixing a reinforcing material although the properties, including the tensile and bending strengths, thereof is improved to some extent.

On the other hand, in order to prevent separation of concrete components and water-pollution problems which would arise when the concrete is placed in water, it has been proposed and adopted to add a viscosity increasing agent, examples of such viscosity increasing agent being polyvinyl alcohol, polyacrylamide, polyethylene oxide, sodium polyacrylate, carboxymethyl cellulose, hydroxyethyl cellulose, methyl cellulose, sodium alginate and guar gum. However, the setting or hardening of the concrete is retarded by the addition of a viscosity increasing agent so that a relatively long time is required before the development of strength with another disadvantage that a large amount or number of bubbles is entrained by the viscosity increasing agent and is mixed in the concrete composition to lower the strength of the hardened concrete. For this reason, it has never been tried to improve the strength of a cement composition by the addition of such a viscosity increasing agent.

OBJECTS AND SUMMARY OF THE INVENTION

A principal object of the present invention is to provide a process for placing a cement composition having remarkably improved strengths.

Another object of the invention is to provide a process for placing a cement composition which is particularly improved in compressive strength.

A further object of the invention is to provide a process for placing a cement composition having considerably improved strengths at low cost without the need of admixing any reinforcing materials.

The above and other objects of the invention will become apparent from the following detailed description of the invention.

The process for placing a cement composition having high strength, according to this invention, comprises the steps of: adding a viscosity increasing agent to a cement to prepare a cement composition containing said viscosity increasing agent; vacuum de-bubbling said cement composition containing said viscosity increasing agent under a reduced pressure to remove relatively large bubbles present in said cement composition and to leave therein only fine bubbles so that 98 vol% or more of the total sum volume of all of the bubbles left after the vacuum de-bubbling are composed of the sum volume of the bubbles each having bubble size of not more than 120 microns; and then allowing the de-bubbled cement composition to be hardened.

DESCRIPTION OF THE INVENTION

The present invention will now be described more specifically.

In the process of the invention, a viscosity increasing agent is added to a cement to prepare a cement composition containing the viscosity increasing agent.

The examples of the cement constituting the main ingredient of the cement composition used in the invention include: various Portland cements such as normal Portland cement, high early strength Portland cement, super high early strength Portland cement and moderate heat Portland cement; alumina cements such as alumina cement and lime-alumina cement; and various mixed cements such as those mixed with blast furnace slag, pozzolanic cement and fly ash cement. The Portland cements, particularly the normal Portland cement, are the most common and preferred cements.

The cement composition of the invention may be prepared, similarly to the preparation of conventional cement mortar or concrete, by mixing with fine and/or coarse aggregates optionally with, for example, a water-reducing and fluidizing agent, such as sodium salts of aromatic sulfonic acids or sodium melamine sulfonate, an antifoaming agent, such as dibutyl phthalate, water-insoluble alcohols, tributyl phosphate and silicone resins, or a hardening promotor, such as calcium chloride, sodium silicate, and sodium aluminate.

In the present invention, the aforementioned viscosity increasing agent may be mixed with components of cement mortar composition or concrete composition in dry form and then added with water, or alternatively the viscosity increasing agent may be added to and mixed with cement mortar or concrete in the form of a solution or powder after the cement mortar or concrete is prepared.

The water/cement ratio of the cement composition used in the invention may range generally within 30 to 150, preferably within 50 to 150.

According to an important aspect of the invention, a viscosity increasing agent is added to the cement composition to impart increased viscosity to the resultant admixture. In the subsequent vacuum de-bubbling step, the thus added viscosity increasing agent acts as a de-bubbling adjusting agent so that only large size bubbles, which would adversely affect the strengths of the hardened mass, are removed by vacuum de-bubbling to leave small size or fine bubbles which improve the workability of the cement composition and the resistance against freezing and melting of the hardened cement composition. Meanwhile, the resistance against freezing and melting means the resistance or endurance to the influence caused by the volume change of water contained in the cement composition in a low temperature environment.

In other words, the viscosity of the cement composition is increased by the addition of the viscosity increasing agent to hold fine bubbles securely therein at the vacuum defoaming step. The terminology "fine bubbles" as herein used throughout the specification and defined in the claims means those of sizes within "the 98% bubble size distribution range". In turn, the terminology "98% bubble size distribution range" means the range within which a large majority in number of bubbles is distributed so that 98 vol% of the total sum volume of all the bubbles are composed of the sum volume of the bubbles each having bubble size of not more than 120 microns, preferably within the range of from 25 microns to 100 microns. In the range of less than 25 microns, the resistance against freezing and melting would be adversely affected occasionally.

Although not critical, it is desirous that the adjacent bubbles are separated from one another by a distance of less than 1000 microns, i.e. the thickness of the cement paste separating each of the adjacent bubbles is less than 1000 microns, and that the number of bubbles in the cement paste is within the range of from 50 to 8000 per $cm^3$.

If the quantity of added viscosity increasing agent is too small, the viscosity of the cement composition becomes too low, resulting in excessive de-bubbling in the subsequent de-bubbling step. As a result, the workability of the cement composition becomes poor, and the resistance against freezing and melting of the cement mortar or concrete is adversely affected. On the contrary, if an excess amount of viscosity increasing agent is added, the viscosity of the mixed cement composition becomes too high so that large size bubbles are left even after the vacuum de-bubbling step, or sometimes the viscosity of the composition reaches the level to make it impossible to effect de-bubbling.

It is, thus, preferred, that the viscosity increasing agent is added in an amount of from 0.001 to 8 parts, preferably 0.1 to 2 parts, by weight, based on 100 parts by weight of the cement, in order to obviate the aforementioned problems.

The vacuum de-bubbling is effected under a reduced pressure. The pressure reduction degree is controlled such that "fine bubbles" are left in the cement composition. A preferable pressure reduction degree ranges from 600 mmHg to the vapor pressure of water, preferably from 200 mmHg to 20 mmHg. If the pressure reduction degree is too high, namely if the vacuum de-bubbling is effected under a too low pressure of lower than the vapor pressure of water, dehydration of the cement composition proceeds so far as to impede further processing. De-bubbling of large size bubbles can not be attained to the extent for exhibiting the advantageous effect of the invention, if the vacuum de-bubbling is carried out at a pressure of higher than 600 mmHg. The vacuum de-bubbling may be carried out by the use of a de-bubbling apparatus which has been used commonly in molding plastics. The vacuum de-bubbling may be carried out while mixing and kneading the cement composition with water, or may be carried out after the composition has been mixed and kneaded with water.

The cement composition is allowed to be set or hardened, after it is de-bubbled to the deprived of large size bubbles.

Examples of the viscosity increasing agent, which may be preferably used in the invention, include carboxymethyl cellulose, other cellulose compounds, polyethyleneoxide, polyvinyl alcohol and a variety of synthetic resin emulsions and mixtures thereof. In the present specification, the terms "cellulose compounds" and "modified cellulose compounds" are used hereinafter without further qualification to mean, respectively, cellulose compounds and modified cellulose compounds exclusive of carboxymethyl cellulose and modifications thereof. However, in order that no claim include two terms which would not be mutually exclusive unless the special definitions of this specification were applied, in the claims the term "other cellulose compounds" is recited after "carboxymethyl cellulose" and is thereby used to include cellulose compounds and modified cellulose compounds as defined in the specification and to exclude carboxymethyl cellulose.

Examples of cellulose compounds are those each having a weight average molecular weight of 10,000 to 2,000,000 and represented by the following general formula of:

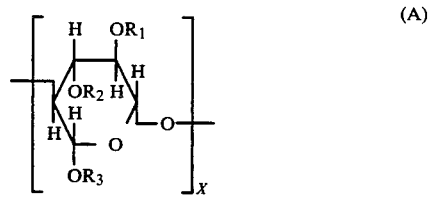

(A)

(wherein $R_1$, $R_2$ and $R_3$ are the same or different groups and represented by the formula of $(O-A_1)_m(O-A_2)_nOA_3$ where $A_1$ and $A_2$ are different groups and selected from ethylene and propylene groups, m and n ranging within 0 to 5, and $A_3$ is hydrogen or a lower alkyl group having 1 to 3 carbon atoms; and x is a positive number. It is preferable that at least one of $R_1$, $R_2$ or $R_3$ contains not less than 0.3 mol of methyl group.)

Typical examples of the cellulose compounds (A) include those represented by the formula (B) of:

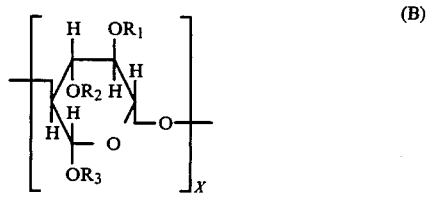

(B)

(wherein $R_1$, $R_2$ and $R_3$ are the same or different groups selected from hydrogen and lower alkyl groups having 1 to 3 carbon atoms, and x is a positive number. It is preferable that at least one of $R_1$, $R_2$ or $R_3$ contains not less than 0.3 mol of methyl group.)

Other than the compounds set forth above, the cellulose compounds (B) may be modified to prepare the compounds represented, respectively, by the following formulae (C) and (D) of:

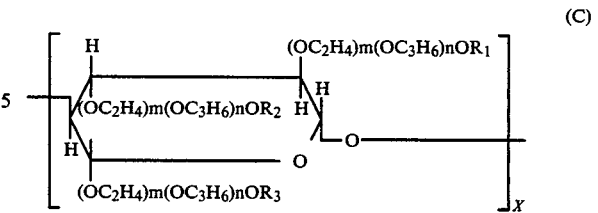

(C)

(wherein m and n range within 0 to 5, with m, n affixed to at least one of the modifying oxyethylene-oxypropylene groups being 0.001 to 5; $R_1$ $R_2$ and $R_3$ are the same or different groups selected from hydrogen and lower alkyl groups having 1 to 3 carbon atoms; and x is a positive number. It is preferable that at least one of $R_1$, $R_2$ or $R_3$ contains not less than 0.3 mol of methyl group.)

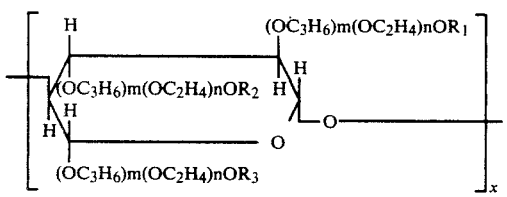

(D)

(wherein m and n range within 0 to 5, with m, n affixed to at least one of the modifying oxypropylene-oxyethylene groups being 0.001 to 5; $R_1$, $R_2$ and $R_3$ are the same or different groups selected from hydrogen and lower alkyl groups having 1 to 3 carbon atoms; and x is a positive number. It is preferable that at least one of $R_1$, $R_2$ or $R_3$ contains not less than 0.3 mol of methyl group.)

As will be seen from the formulae (C) and (D), 0.001 to 5.0 mols, preferably 0.8 to 3.0 mols of oxyethylene group are introduced in a cellulose unit, and 0.001 to 5.0 mols, preferably 0.001 to 0.5 mols, of oxypropylene group is introduced in a cellulose unit.

The modified cellulose compounds having only one of the oxyethylene or oxypropylene group, as represented by the following formulae (E) and (F), may be used.

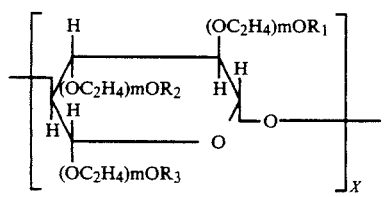

(E)

(wherein m ranges within 0 to 5, with m, affixed to at least one of the modifying oxyethylene groups being 0.001 to 5; $R_1$, $R_2$ and $R_3$ are the same or different groups selected from hydrogen and lower alkyl groups having 1 to 3 carbon atoms; and x is a positive number. It is preferable that at least one of $R_1$, $R_2$ or $R_3$ contains not less than 0.3 mol of methyl group.)

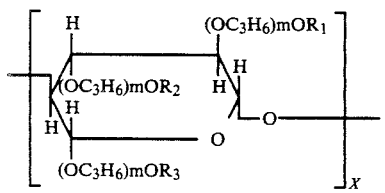

(F)

(wherein m ranges within 0 to 5, with m affixed to at least one of the modifying oxypropylene groups being 0.001 to 5; $R_1$, $R_2$ and $R_3$ are the same or different groups selected from hydrogen and lower alkyl groups having 1 to 3 carbon atoms; and x is a positive number. It is preferable that at least one of $R_1$, $R_2$ or $R_3$ contains not less than 0.3 mol of methyl group.)

Since greater viscosity increase results from the use of the modified cellulose compounds (C) to (F) as compared with the case where the unmodified cellulose compound (B) is used, the viscosity of the cement composition can be increased to a desired level by adding a smaller quantity of any one of the modified cellulose compounds (C) to (F). Particularly, by introducing 0.8 to 3.0 mols, per cellulose unit, of oxyethylene group and 0.001 to 0.5 mols, per cellulose unit, of oxypropylene group, the resultant modified cellulose compounds are provided with well-balanced properties, i.e. well-balanced viscosity and solubility, to be advantageously used in the invention to ensure that a large number of fine bubbles is left after the vacuum de-bubbling step. The modified cellulose compounds (E) and (F) may be used together.

The cellulose compounds used in the invention have average molecular weights ranging within 10,000 to 2,000,000, preferably within 20,000 to 1,700,000. The viscosity increasing effect of the compound becomes so poor as to allow removal of fine bubbles at the vacuum de-bubbling step, if it has a molecular weight of less than 10,000. If the molecular weight exceeds 2,000,000, the cellulose compound becomes scarcely soluble and cannot be used in the present invention.

The modified cellulose compounds (C) to (F) may be prepared by adding, simultaneously or separately, ethylene oxide and/or propylene oxide to methyl cellulose, followed by reacting at a temperature around room temperature for a few hours. The modified cellulose compounds (C) to (F) may be, of course, prepared by other processes to be conveniently used in the invention.

The cellulose compounds, which may be used in the invention, include those represented by the formula (A) wherein $R_1$, $R_2$ and $R_3$ in —$OR_1$, —$OR_2$ and —$OR_3$ are lower alkyl groups having 2 to 3 carbon atoms, rather than methyl group, such as ethoxy and propoxy groups. A mixture added with glyoxal for preventing flocculated or coagulated portions may be used.

Carboxymethyl cellulose (hereinafter referred to CMC) may also be used as the viscosity increasing agent in the invention.

The CMC used as the viscosity increasing agent in the invention is represented by the following formula of:

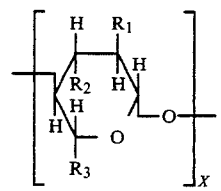

(G)

(wherein $R_1$, $R_2$ and $R_3$ are hydroxyl group or —$CH_2OCH_2COOM$, at least one of $R_1$, $R_2$ and $R_3$ being —$CH_2OCH_2COOM$, where M is sodium, ammonium or calcium; and x is a positive number of 50 to 2,000.)

The compound represented by the formula (G), wherein $R_1$ is a carboxymethyl group and $R_2$ and $R_3$ are hydroxyl groups, is acknowledged as the compound having the degree of etherification (substitution) of 1.0. Those each having an average etherification degree of from 0.2 to 3.0 may be used in the invention. A CMC having an average etherification degree of less than 0.2 cannot be used in the invention because of lack of solubility, whereas difficulties are encountered if the CMC used in the invention has an average etherification degree of more than 3.0 because of its excessive moisture absorption tendency.

The average polymerization degree of the CMC used in the invention may range within 50 to 2,000, preferably 250 to 800. If the used CMC has an average polymerization degree of less than 50, a viscous cement composition cannot be formed, resulting in de-bubbling of fine bubbles at the vacuum de-bubbling operation. On the contrary, a CMC having an average polymerization degree of more than 2,000 cannot be used due to lack in solubility.

The CMC used in the invention may be prepared by a so-called acetylation method wherein raw pulp is immersed in a 15 to 20% aqueous solution of sodium hydroxide to form alkaki cellulose which is oxidized and depolymerized with air to lower the polymerization degree, and then monochloroacetic acid is added to the reaction system while being pulverized under agitation to obtain a CMC product; by a so-called monochloro-method wherein raw pulp is immersed in an aqueous solution of sodium monochloroacetic acid and then added with sodium hydroxide is added under agitation to effect pulverization, followed by depolymerization treatment; and by a so-called solvent method comprising the steps of dissolving sodium hydroxide in a solvent, such as ethanol, isopropanol or acetone, charging chipped pulp to form alkali cellulose, adding monochloroacetic acid dissolved in a solvent to effect etherification, and neutralizing the reaction mixture after the completion of etherification to obtain a CMC product. A variety of other methods are known and may be used according to the invention.

Polyethyleneoxide may also be used as the viscosity increasing agent in the invention. Examples of polyethyleneoxide used in the invention are those having a weight average molecular weight within the range of from 100,000 to 5,000,000, preferably 200,000 to 4,000,000, and represented by the formula of $HOCH_2CH_2O-CH_2CH_2O]_nH$ (wherein n is a positive number). A polyethyleneoxide having a molecular weight of less than 100,000 cannot be used in the present invention, since the cement composition added therewith has only a little viscosity so that fine bubbles have been lost at the de-bubbling step, whereas a polyethyleneoxide having a molecular weight of more than 5,000,000 cannot be used due to lack in solubility.

The polyethyleneoxides used in the invention may be prepared in the presence of an alkali earth metal base catalyst or an aluminium alkoxide base polymerization catalyst, and commercially available examples thereof are sold under the Trade Names "Polyox" (produced by Union Carbide Corporation), "Alcox" (produced by Meisei Kagaku Co., Ltd.) and "PEO" (produced by Seitetsu Kagaku Co., Ltd.). These commercially available products may be conveniently used in the present invention.

Moreover, polyvinyl alcohols may be used as the viscosity increasing agent in the invention, as well. The polyvinyl alcohols, which may be conveniently used in the invention, should have a degree of hydrolysis ranging within 60 to 99 mol%, preferably 80 to 99 mol%, and an average polymerization degree of 200 to 3,000, preferably 300 to 2,400. Those having a degree of hydrolysis of less than 60 mol% are inferior in solubility in water, whereas those having a degree of hydrolysis of 99 mol% cannot be used since the solubility in water becomes poor abruptly. On the other hand, a polyvinyl alcohol having an average polymerization degree of less than 200 cannot be used effectively in the invention, since the viscosity of the cement composition mixed therewith becomes too low so that fine bubbles which must be present in the final cement composition to realize the merit of the invention are de-bubbled at the vacuum de-foaming step. On the contrary, the viscosity of the cement composition mixed with a polyvinyl alcohol having an average polymerization degree of more than 3,000 becomes so high as to hinder vacuum de-bubbling.

The polyvinyl alcohols used in this invention may be prepared by hydrolyzing polyvinyl alcohols using an alkali, acid or aqueous ammonia. Commercially available products each having an average polymerization degree of 200 to 2,600 may be conveniently used.

Polyvinyl alcohols, which may be used in the invention, include modified polyvinyl alcohols. Modified polyvinyl alcohols include, for example, polyvinyl alcohols each having a main or side chain into which there are introduced hydrophilic anion groups, such as carboxy groups, sulfuric ester groups, phosphoric ester groups and salts thereof. These modified polyvinyl alcohols may be prepared by introducing a variety of hydrophilic anion groups through various processes, for example, by a carboxylation process in which carboxyl groups are introduced by hydrolyzing a copolymer of vinyl acetate and an unsaturated aliphatic carboxylic acid or an ester thereof, such as crotonic acid, acrylic acid, maleic acid anhydride, itaconic acid and methylmethacrylate. Other processes for the introduction of hydrophilic anion groups are a sulfuric-esterification process wherein a polyvinyl alcohol is treated in a concentrated aqueous solution of sulfuric acid to introduce sulfuric ester groups; a sulfuric-esterification process wherein chlorosulfonic acid is added to the —OH groups of a polyvinyl alcohol by condensation to introduce sulfuric ester groups; a phosphoric esterification process wherein a polyvinyl alcohol is subjected to heating treatment in a concentrated aqueous solution of phosphoric acid to introduce phosphoric ester groups; and a phosphoric-esterification process wherein phosphorus oxychloride is added to the —OH groups of a polyvinyl alcohol by condensation to introduce phosphoric ester groups. These modified polyvinyl alcohols may be mixed with the unmodified polyvinyl alcohols for use as the viscosity increasing agents in the invention.

As described hereinbefore, various synthetic resin emulsions may be used in the present invention, provided that they are excellent in blendability with the used cement. Preferable examples thereof are a vinyl acetate polymer emulsion sold under the Trade Name "Movinyl Powder-M-1" from Hoechst AG, and modified vinyl acetate copolymers such as vinyl acetate-vinyl versatic acid ester copolymer emulsion sold under the Trade Name "Movinyl Powder-DM200" from Hoechst AG.

According to the process of the invention for placing a cement composition, the strengths of the placed cement composition can be improved remarkably, particular improvement being exhibited in compressive strength to realize the result that a compressive strength as high as about 1.5 times of that prepared by the conventional process was developed.

EXAMPLES OF THE INVENTION

The present invention will now be described by referring to specific examples thereof. In the following examples, "part" and "%" mean, respectively, "part by weight" and "% by weight" unless otherwise specified.

EXAMPLE 1

A cellulose compound having a weight average molecular weight of 100,000 and represented by the formula (B) wherein $R_1$ and $R_2$ are methyl groups and $R_3$ is hydrogen was used as the viscosity increasing agent for controlling the vacuum de-bubbling operation. The cellulose compound was added, while changing the added quantity as set forth in Table 1, to a concrete composition composed of 350 parts of a cement, 620 parts of fine aggregates and 1120 parts of coarse aggregates. The concrete composition to which was added a varying quantity of the cellulose compound, respectively, was mixed with water at water/cement ratio of 55.0%.

The concrete composition was then transferred to a 1 m$\phi$ × 1.5 m ball mill to be processed therein at a rotational speed of 12 rpm and at a pressure of 30 mmHg for 5 minutes. After processing in the ball mill, the air content of the processed mass was determined generally in accordance with the JIS A 1128-75 Method. The processed concrete composition was cast into a 10 cm$\phi$ × 20 cm mold for molding test specimens for compressive and tensile strengths, and into a 15 cm × 15 cm × 53 cm mold for molding test specimens for bending strength. The test specimens were removed from the molds in the next day and then subjected to standard ageing for 28 days. Using those test specimens, the compressive strength, tensile strength and bending strength were determined generally in accordance with JIS A 1108, JIS A 1113 and JIS A 1106, respectively. Also, the bubble distribution in the concrete was investigated by the mercury press-in method. The results are shown in Table 1.

because the quantity of added viscosity increasing agent is too small, and it is estimated that the resistance against freezing and melting is inferior to those of the concretes of Run Nos. 2 to 9. In contrast thereto, each of the concretes of Run Nos. 2 to 9 has an adequate air content of 0.7 to 3.0% and is improved in strength over those of Run Nos. 11 and 12 wherein the vacuum de-bubbling step is omitted. The compressive strength of each of the concretes of Run Nos. 2 to 9 is remarkably increased when compared to the result of Run No. 10 where an excess quantity of the cellulose compound is added with attendant disadvantage that de-bubbling is not effected satisfactorily. Particularly excellent increase in compressive strengths are found in Run Nos. 3 to 7. The result of Run No. 11 shows that the strengths are seriously lowered when a viscosity increasing agent is added without being followed by de-bubbling operation, and it should be reasonable to consider that such a serious lowering in strength is caused by the presence of large size bubbles entrained by the addition of the viscosity increasing agent.

EXAMPLE 2

100 parts of a cement was added with 1.0 part of each of the cellulose compounds as set forth in Table 2. A cement mortar composed of 33% of the cement and 67% of sand was prepared by adding water thereto in a water/cement ratio of 50%. Using a similar mill as used in Example 1, each of the cement mortars was subjected to de-bubbling at 27 mmHg while mixing under agita-

TABLE 1

| Ex. 1 Run No. | Quantity of Cellulose Compound Added to 100 Parts of Cement (parts) | Bubbles Air Content (%) | 98% Bubbles Distribution Range ($\mu$) | Strength Compressive strength (kg/cm$^2$) | Tensile Strength (kg/cm$^2$) | Bending Strength (kg/cm$^2$) |
|---|---|---|---|---|---|---|
| 1  | 0.0008 | 0.2 | 5~15   | 204 | 29.3 | 52.4 |
| 2  | 0.001  | 0.7 | 5~45   | 207 | 32.2 | 50.1 |
| 3  | 0.1    | 1.3 | 5~50   | 206 | 30.8 | 49.8 |
| 4  | 0.5    | 1.8 | 5~55   | 209 | 27.4 | 47.5 |
| 5  | 1.0    | 2.4 | 5~55   | 213 | 28.3 | 46.3 |
| 6  | 1.5    | 2.7 | 5~60   | 205 | 29.2 | 49.7 |
| 7  | 2.0    | 2.9 | 5~70   | 216 | 31.5 | 54.3 |
| 8  | 4.0    | 3.0 | 5~75   | 232 | 30.2 | 58.5 |
| 9  | 8.0    | 2.9 | 5~80   | 228 | 28.4 | 47.3 |
| 10 | 10.0   | 4.3 | 5~200  | 180 | 25.3 | 32.1 |
| 11 | 0.1    | 4.9 | 5~3000 | 154 | 22.4 | 30.4 |
| 12 | 0.0    | 4.5 | 5~1500 | 173 | 26.3 | 46.5 |

Run No. 11 was a comparative experiment wherein the vacuum de-bubbling step was omitted, and Run No. 12 was a comparative experiment wherein the addition of the cellulose compound and the vacuum defoaming step were omitted.

As will be seen from the results shown in Table 1, the concrete of Run No. 1 has a low air content with the bubbles therein distributing in a finer bubble size range, tion. Respective test specimens prepared according to the procedure similar to Example 1 were subjected to the tests conducted similarly. The results are shown in Table 2. Meantime, the letters (B) to (F) appearing in the column under the caption "chemical formula" show that the cellulose compounds, respectively, represented by the designated chemical formulae herein above were used in the specific runs.

TABLE 2

| Ex. 2 Run No. | Weight Average Molecular Weight | Oxyethylene Group (Mol/Cellulose Unit) | Oxypropylene Group (Mol/Cellulose Unit) | Methoxy Group (Mol/Cellulose Unit) | Chemical Formula | Bubbles Air Content (%) | 98% Bubbles Distribution Range ($\mu$) | Strength Compressive Strength (kg/cm$^2$) | Tensile Strength (kg/cm$^2$) | Bending Strength (kg/cm$^2$) |
|---|---|---|---|---|---|---|---|---|---|---|
| 1 | 40,000    | 0   | 0   | 1   | B | 2.3 | 5~60 | 218 | 25.8 | 45.0 |
| 2 | 100,000   | 0   | 0   | 1.5 | B | 3.2 | 5~75 | 205 | 27.3 | 47.8 |
| 3 | 1,300,000 | 0   | 0   | 1   | B | 3.0 | 5~75 | 222 | 28.1 | 43.2 |
| 4 | 150,000   | 2.5 | 0   | 1.5 | E | 2.8 | 5~85 | 218 | 27.2 | 45.5 |
| 5 | 150,000   | 0   | 0.5 | 2   | F | 3.1 | 5~65 | 236 | 26.4 | 49.3 |
| 6 | 300,000   | 1.0 | 1.0 | 1.5 | C | 3.2 | 5~70 | 209 | 29.3 | 50.2 |
| 7 | 300,000   | 0   | 2.0 | 1.5 | F | 2.7 | 5~70 | 211 | 31.5 | 47.5 |

TABLE 2-continued

| Ex. 2 Run No. | Weight Average Molecular Weight | Oxyethylene Group (Mol/ Cellulose Unit) | Oxypropylene Group (Mol/ Cellulose Unit) | Methoxy Group (Mol/ Cellulose Unit) | Chemical Formula | Bubbles Air Content (%) | 98% Bubbles Distribution Range ($\mu$) | Compressive Strength (kg/cm$^2$) | Tensile Strength (kg/cm$^2$) | Bending Strength (kg/cm$^2$) |
|---|---|---|---|---|---|---|---|---|---|---|
| 8 | 500,000 | 1.0 | 0.5 | 1.5 | D | 3.3 | 5~75 | 231 | 28.4 | 50.1 |
| 9 | 1,000 | 2 | 0.2 | 1.5 | D | 0.2 | 5~20 | 215 | 30.7 | 42.3 |
| 10 | — | — | — | — | — | 0.3 | 5~10 | 203 | 27.6 | 40.5 |
| 11 | 10,000 | 0 | 0 | 1.5 | B | 4.9 | 5~3000 | 156 | 22.1 | 22.4 |

Run No. 10 was a comparative experiment wherein the cement mortar was subjected to de-bubbling operation without the addition of a cellulose compound, and Run No. 11 was another comparative experiment wherein a cellulose compound was added without being followed by vacuum de-bubbling operation.

As will be seen from the results set forth in Table 2, the cement mortar of Run No. 9 is excessively de-bubbled, due to insufficient viscosity, which would raise a problem in resistance against freezing and melting, since the cellulose compound used in Run No. 9 has a weight averge molecular weight somewhat smaller than the defined range. The result of Run No. 10 reveals that the cement mortar is so de-bubbled as to raise a problem in resistance against freezing and melting, when it is subjected to de-bubbling without the addition of any viscosity increasing agent. In the cement mortar of Run No. 11 which has not been subjected to de-bubbling, large size bubbles are entrained by the viscosity increasing agent and left in the hardened mortar to lower the strengths seriously.

EXAMPLE 3

Used viscosity increasing agent was a cellulose compound (represented by the general formula (F) wherein m=0.2) having a weight average molecular weight of 50,000, 1.5 mol/cellulose unit of methoxy group and 0.2 mol/cellulose unit of oxypropylene group. Similarly to Example 1, a cement mortar was prepared by adding 0.7 parts of the viscosity increasing agent per 100 parts of a cement mixed with a sand in a ratio of 33% of cement to 67% of sand and added with water in a water/cement ratio of 50%. The cement mortar was subjected tests, similarly to Example 1. The results are shown in Table 3.

TABLE 3

| Foam Bubble | | Strength | | |
|---|---|---|---|---|
| Air content (%) | 98% Bubbles Distribution Range ($\mu$) | Compressive Strength (kg/cm$^2$) | Tensile Strength (kg/cm$^2$) | Bending Strength (kg/cm$^2$) |
| 0.3 | 5~60 | 305 | 32.5 | 60.5 |

EXAMPLE 4

The cellulose compounds (E) and (F) as set forth in Table 4 were added to a concrete in the ratios as set forth in the Table, the concrete being composed of 16.7% of a cement, 30.0% of a sand and fine and coarse aggregates of 53.3% and having a water/cement ratio of 45%. The thus prepared concrete compositions were subjected to the tests, similarly to Example 1. The results are shown in Table 5.

TABLE 4

| | Cellulose Compound (E) Modified with Oxyethylene | | | Cellulose Compound (F) Modified with Oxypropylene | | | Quantity of Modified Cellulose Compound (F) Added to 1 Mol of Modified Cellulose Compound (E) (mol) |
|---|---|---|---|---|---|---|---|
| Ex. 4 Run No. | Weight Average Molecular Weight | Oxyethylene Group (Mol/ Cellulose Unit) | Methoxy Group (Mol/ Cellulose Unit) | Weight Average Molecular Weight | Oxypropylene Group (Mol/ Cellulose Unit) | Methoxy Group (Mol/ Cellulose Unit) | |
| 1 | 50,000 | 1.5 | 0.5 | 80,000 | 1.5 | 0.5 | 0.2 |
| 2 | 50,000 | 1.5 | 0.5 | 80,000 | 2.0 | 0.3 | 0.1 |
| 3 | 50,000 | 2.0 | 0.3 | 100,000 | 1.5 | 0.3 | 0.05 |
| 4 | 80,000 | 2.0 | 0.3 | 120,000 | 2.0 | 2.0 | 0.05 |

TABLE 5

| Ex. 4 Run No. | Quanity of Cellulose Compound of the Invention (Compound (E) + Compound (F) Added to 100 parts of Cement) (part) | Bubbles Air Content (%) | 98% Bubble Distribution Range ($\mu$) | Compressive Strength (kg/cm$^2$) | Tensile Strength (kg/cm$^2$) | Bending Strength (kg/cm$^2$) |
|---|---|---|---|---|---|---|
| 1 | 0.05 | 2.0 | 5~60 | 232 | 25.8 | 43.2 |
| 2 | 0.2 | 3.2 | 5~50 | 240 | 30.4 | 48.3 |
| 3 | 0.3 | 3.4 | 5~45 | 218 | 35.8 | 55.4 |
| 4 | 0.3 | 2.8 | 5~45 | 207 | 40.1 | 60.3 |

COMPARATIVE EXAMPLE 1

The concrete of Run No. 6 in Example 1 was subjected to vacuum de-bubbling effected under a reduced pressure of 5 mmHg. The result was that the concrete was dehydrated to an uncastable state.

EXAMPLE 5

As the viscosity increasing agent for controlling vacuum defoaming, used was a modified cellulose compound (represented by the formula (C) wherein m=2.5 and n=0.2; $R_1$, $R_2$ and $R_3$ are hydrogen.) having a weight average molecular weight of 100,000, 2.5 mol/cellulose unit of oxyethylene group and 0.2 mol/cellulose unit of oxypropylene group. To a concrete composition composed of 350 parts of a cement 620 parts of a fine aggregate and 1120 parts of a coarse aggregate and having a water/cement ratio of 55.0% was added the aforementioned modified cellulose compound in a ratio set forth in each Run in Table 6. The concrete compositions of respective Runs were subjected to tests, similarly to Example 1. The results are shown in Table 6.

cement and 67% of sand and having a water/cement ratio of 50%. Using a similar pilot plant as used in Example 1, each of the cement mortars to which was added modified cellulose compounds was de-bubbled while being mixed under agitation at 27 mmHg. The thus prepared cement mortar compositions were tested to obtain the results shown in Table 7. Meantime, the letters (C) and (D) in the Table indicates that the modified cellulose compounds are those represented by the formulae (C) and (D), respectively, wherein each of $R_1$, $R_2$ and $R_3$ are hydrogen).

TABLE 6

| Ex. 5 Run No. | Quantity of Modified Cellulose Compound Added to 100 parts of Cement (parts) | Bubbles Air Content (%) | 98% Bubble Distribution Range ($\mu$) | Strength Compressive Strength (kg/cm$^2$) | Tensile Strength (kg/cm$^2$) | Bending Strength (kg/cm$^2$) |
|---|---|---|---|---|---|---|
| 1 | 0.0008 | 0.2 | 5~20 | 203 | 27.8 | 55.8 |
| 2 | 0.001 | 0.9 | 5~60 | 208 | 30.5 | 54.3 |
| 3 | 0.1 | 1.4 | 5~65 | 211 | 31.2 | 54.1 |
| 4 | 0.5 | 1.8 | 5~65 | 225 | 30.3 | 53.2 |
| 5 | 1.0 | 1.8 | 5~70 | 218 | 29.4 | 58.2 |
| 6 | 1.5 | 2.3 | 5~75 | 213 | 33.5 | 53.4 |
| 7 | 2.0 | 2.7 | 5~80 | 203 | 31.0 | 59.1 |
| 8 | 4.0 | 2.6 | 5~80 | 185 | 32.8 | 53.3 |
| 9 | 8.0 | 2.9 | 5~80 | 181 | 30.9 | 52.8 |
| 10 | 10.0 | 4.0 | 5~200 | 165 | 25.8 | 35.0 |
| 11 | 0.1 | 5.0 | 5~3000 | 130 | 14.3 | 29.3 |

TABLE 7

| Ex. 6 Run No. | Weight Average Molecular Weight | Oxyethylene Group (Mol/Cellulose Unit) | Oxypropylene Group (Mol/Cellulose Unit) | Chemical Formula | Bubbles Air Content (%) | 98% Bubble Distribution Range ($\mu$) | Strength Compressive Strength (kg/cm$^2$) | Tensile Strength (kg/cm$^2$) | Bending Strength (kg/cm$^2$) |
|---|---|---|---|---|---|---|---|---|---|
| 1 | 40,000 | 2.5 | 0.3 | C | 1.8 | 5~50 | 240 | 33.4 | 65.3 |
| 2 | 100,000 | 2.5 | 0.2 | C | 2.2 | 5~65 | 238 | 32.3 | 64.8 |
| 3 | 150,000 | 1.8 | 0.3 | C | 2.6 | 5~65 | 243 | 34.5 | 57.5 |
| 4 | 150,000 | 2.0 | 0.3 | C | 3.5 | 5~65 | 225 | 33.9 | 58.3 |
| 5 | 150,000 | 2.5 | 0.3 | D | 3.7 | 5~70 | 251 | 35.1 | 59.1 |
| 6 | 300,000 | 1.8 | 0.1 | C | 3.3 | 5~80 | 239 | 34.5 | 57.8 |
| 7 | 300,000 | 2.0 | 0.1 | D | 3.1 | 5~70 | 253 | 33.8 | 62.1 |
| 8 | 500,000 | 2.5 | 0.05 | C | 2.0 | 5~70 | 244 | 33.4 | 60.5 |
| 9 | 1,000 | 2.5 | 0.3 | C | 0.1 | 5~20 | 243 | 34.7 | 57.5 |
| 10 | 15,000 | 2.5 | 0.3 | C | 5.8 | 5~3000 | 151 | 23.2 | 30.7 |

Run No. 11 is a comparative experiment wherein the composition was not processed through the vacuum de-bubbling step.

As will be apparent from the result of Run No. 1, the quantity of added viscosity increasing agent is so small as to lower the presence of bubbles in the resultant concrete, which would raise a problem in the resistance against freezing and melting. In contrast thereto, each of the concrete of Run Nos. 2 to 9 has an adequate air content ranging within 0.9 to 2.9%, and is considerably improved in compressive strength over that of the concrete of Run No. 11 wherein the vacuum de-bubbling step is omitted and over that of the concrete of Run No. 10 wherein an excess quantity of the modified cellulose compound is added to result in insufficient de-bubbling. The result of Run No. 11 shows that the strengths are seriously lowered when a viscosity increasing agent is added without being followed by de-bubbling operation due to the presence of large size bubbles enclosed in the hardened mass.

EXAMPLE 6

Each of the modified cellulose compounds set forth in Table 7 was added, in a ratio of 1.0 part to 100 parts of cement, to a cement mortar composed of 33% of a Run No. 10 is a comparative experiment wherein the modified cellulose compound was added without being followed by vacuum de-bubbling.

As will be apparent from the results shown in Table 7, the cement mortar of Run No. 9 to which was added a cellulose compound having a smaller weight average molecular weight is de-bubbled excessively, which might raise a problem in the resistance against freezing and melting. The result of Run No. 10 shows that larger size bubbles are left and enclosed in the hardened mass to lower the strengths seriously, when a viscosity increasing agent is merely added without being followed by subsequent de-bubbling operation.

EXAMPLE 7

A cellulose compound (represented by the general formula (E) wherein m=1.8; $R_1$, $R_2$ and $R_3$ are hydrogen.) having a weight average molecular weight of 50,000 and 1.8 mol/cellulose unit of oxyethylene group was added to a concrete composition composed of 350 parts of a cement, 620 parts of a fine aggregate and 1120 parts of a coarse aggregate. The water/cement ratio of the concrete was 55.0%, and the added quantity of the cellulose compound to 100 parts of the cement was changed as set forth in the Table.

The results of the tests conducted generally in accordance with the procedures as described in Example 1 are shown in Table 8.

TABLE 8

| Ex. 7 Run No. | Quantity of Modified Cellulose Compound Added to 100 Parts of Cement (parts) | Bubbles | | Strength | | |
|---|---|---|---|---|---|---|
| | | Air Content (%) | 98% Bubble Distribution Range (μ) | Compressive Strength (kg/cm²) | Tensile Strength (kg/cm²) | Bending Strength (kg/cm²) |
| 1 | 0.0008 | 0.3 | 5~20 | 197 | 28.1 | 53.7 |
| 2 | 0.001 | 0.8 | 5~60 | 205 | 30.3 | 50.5 |
| 3 | 0.1 | 1.5 | 5~65 | 213 | 31.5 | 54.7 |
| 4 | 0.5 | 1.9 | 5~65 | 211 | 32.0 | 53.2 |
| 5 | 1.0 | 2.1 | 5~70 | 218 | 30.5 | 58.5 |
| 6 | 1.5 | 2.1 | 5~75 | 223 | 29.8 | 56.6 |
| 7 | 2.0 | 1.9 | 5~75 | 195 | 31.2 | 54.1 |
| 8 | 4.0 | 2.8 | 5~80 | 187 | 30.4 | 54.3 |
| 9 | 8.0 | 3.1 | 5~85 | 188 | 27.7 | 42.1 |
| 10 | 10.0 | 4.1 | 5~200 | 153 | 26.2 | 34.7 |
| 11 | 0.1 | 5.0 | 5~3000 | 130 | 14.3 | 29.3 |

Run No. 11 is a comparative experiment wherein the vacuum de-bubbling step was omitted.

As will be clear from the results shown, the air content in the concrete of Run No. 1 is small since the quantity of the viscosity increasing agent is too small, which would cause a problem in the resistance against freezing and melting. In contrast thereto, the concretes of Run Nos. 2 to 9 have adequate air contents ranging within 0.9 to 3.1% and the strengths thereof are improved so that the compressive strengths are considerably increased when compared to Run No. 10 where an excessive amount of modified cellulose compound is added to result in insufficient de-bubbling and also compared to Run No. 11 where the de-bubbling step is omitted. Meanwhile, Run No. 11 shows that the strengths of the concrete are rather decreased due to entrained large size bubbles when a viscosity increasing agent is added without being followed by de-bubbling operation.

EXAMPLE 8

Each of the modified cellulose compounds (represented by the formula (E); $R_1$ and $R_2$ and $R_3$ are hydrogen.) set forth in Table 9 was added, in a ratio of 1.0 part of 100 parts of cement, to a cement mortar composed of 33% of a cement and 67% of sand and having a water/cement ratio of 50%. Using a similar pilot plant as used in Example 1, each of the cement mortars to which was added modified cellulose compounds was de-bubbled while being kneaded under agitation at 27 mmHg. The thus prepared cement mortar compositions were tested to obtain the results shown in Table 9.

TABLE 9

| Ex. 8 Run No. | Weight Average Molecular Weight | Oxyethylene Group (Mol/ Cellulose Unit) | Bubbles | | Strength | | |
|---|---|---|---|---|---|---|---|
| | | | Air Content (%) | 98% Bubble Distribution Range (μ) | Compressive Strength (kg/cm²) | Tensile Strength (kg/cm²) | Bending Strength (kg/cm²) |
| 1 | 40,000 | 2.5 | 1.3 | 5~50 | 238 | 32.8 | 60.3 |
| 2 | 100,000 | 2.5 | 2.4 | 5~50 | 242 | 34.5 | 58.7 |
| 3 | 150,000 | 1.8 | 2.7 | 5~65 | 245 | 30.8 | 57.5 |
| 4 | 150,000 | 2.0 | 3.2 | 5~70 | 243 | 35.5 | 59.3 |
| 5 | 150,000 | 2.5 | 3.8 | 5~75 | 246 | 35.8 | 60.8 |
| 6 | 300,000 | 1.8 | 3.4 | 5~80 | 241 | 29.9 | 61.2 |
| 7 | 300,000 | 2.0 | 3.1 | 5~85 | 248 | 32.7 | 59.4 |
| 8 | 500,000 | 2.5 | 2.8 | 5~90 | 250 | 34.5 | 59.8 |

EXAMPLE 9

A CMC having an etherification degree of 0.8 and an average polymerization degree of 300 was added, the added quantity being changed in respective Runs as set forth in Table 10, to a cement composition composed of 318 parts of a cement, 7 parts of a sodium melaminesulfonate base water-reducing agent, 763 parts of a fine aggregate and 1008 parts of a coarse aggregate and having a water/cement ratio of 40%. The thus prepared concrete samples were tested generally in accordance with the procedures as described in Example 1. The results are shown in Table 10.

TABLE 10

| Ex. 9 Run No. | Quantity of CMC Added to 100 Parts of Cement (parts) | Bubbles | | Strength | | |
|---|---|---|---|---|---|---|
| | | Air Content (%) | 98% Bubble Distribution Range (μ) | Compressive Strength (kg/cm²) | Tensile Strength (kg/cm²) | Bending Strength (kg/cm²) |
| 1 | 0.001 | 0.6 | 5~35 | 368 | 37.2 | 60.5 |
| 2 | 0.1 | 1.4 | 5~60 | 379 | 38.3 | 64.2 |
| 3 | 0.5 | 1.5 | 5~70 | 365 | 38.4 | 63.8 |
| 4 | 1.0 | 1.9 | 5~80 | 366 | 37.3 | 62.2 |
| 5 | 1.5 | 2.2 | 5~80 | 381 | 38.8 | 60.7 |

TABLE 10-continued

| Ex. 9 Run No. | Quantity of CMC Added to 100 Parts of Cement (parts) | Bubbles Air Content (%) | 98% Bubble Distribution Range ($\mu$) | Strength Compressive Strength (kg/cm$^2$) | Tensile Strength (kg/cm$^2$) | Bending Strength (kg/cm$^2$) |
|---|---|---|---|---|---|---|
| 6 | 2.0 | 2.1 | 5~75 | 377 | 38.0 | 64.3 |
| 7 | 4.0 | 2.2 | 5~80 | 385 | 37.5 | 63.2 |
| 8 | 8.0 | 2.3 | 5~80 | 370 | 39.2 | 61.4 |

EXAMPLE 10

Each of the CMC samples set forth in Table 11 was added, in a ratio of 0.2 parts to 100 parts of cement, to a cement mortar composed of 33% of a cement and 67% of sand and having a water/cement ratio of 50%. Using a similar pilot plant as used in Example 1, each of the cement mortars to which was added the CMC was de-bubbled while being mixed under agitation at 27.5 mmHg. The thus prepared cement mortar compositions were tested to obtain the results shown in Table 11.

TABLE 11

| Ex. 10 Run No. | Average Polymerization Degree | Etherification Degree | Bubbles Air Content (%) | 98% Bubble Distribution Range ($\mu$) | Strength Compressive Strength (kg/cm$^2$) | Tensile Strength (kg/cm$^2$) | Bending Strength (kg/cm$^2$) |
|---|---|---|---|---|---|---|---|
| 1 | 250 | 0.8 | 1.1 | 5~60 | 185 | 27.4 | 41.5 |
| 2 | 300 | 0.6 | 0.8 | 5~50 | 182 | 28.5 | 40.5 |
| 3 | 400 | 0.5 | 1.4 | 5~50 | 178 | 28.3 | 42.3 |
| 4 | 400 | 0.8 | 2.0 | 5~40 | 186 | 27.7 | 43.7 |
| 5 | 400 | 2.0 | 1.8 | 5~60 | 175 | 28.9 | 44.1 |
| 6 | 800 | 0.9 | 2.2 | 5~85 | 178 | 30.5 | 44.4 |
| 7 | 800 | 1.5 | 2.3 | 5~90 | 172 | 26.5 | 38.5 |
| 8 | 1500 | 2.0 | 2.5 | 5~70 | 185 | 26.8 | 43.5 |
| 9 | 30 | 0.9 | 0.3 | 5~20 | 123 | 20.5 | 30.5 |

It will be seen from the Table that the CMC used in Run No. 9 has an average polymerization degree which is smaller than the defined range, leading to lower viscosity of the cement mortar to cause excessive de-bubbling, which would cause a problem in the resistance against freezing and melting.

EXAMPLE 11

A polyethyleneoxide having a weight average molecular weight of 1,000,000 to 1,700,000 available under the Trade Name "PEO-8" (produced by Seitetsu Kagaku Co., Ltd.) was added as the viscosity increasing agent for controlling vacuum de-bubbling, the added quantity being changed in respective Runs as set forth in Table 12, to a concrete composition composed of 318 parts of a cement, 763 parts of a fine aggregate and 1008 of a coarse aggregate and having a water/cement ratio of 50%. The thus prepared concrete compositions were tested to obtain the results shown in Table 12.

TABLE 12

| Ex. 11 Run No. | Quantity of Polyethyleneoxide Added to 100 parts of Cement (parts) | Bubbles Air Content (%) | 98% Bubble Distribution Range ($\mu$) | Strength Compressive Strength (kg/cm$^2$) | Tensile Strength (kg/cm$^2$) | Bending Strength (kg/cm$^2$) |
|---|---|---|---|---|---|---|
| 1 | 0.001 | 0.8 | 5~60 | 250 | 29.8 | 62.3 |
| 2 | 0.1 | 1.1 | 5~65 | 254 | 32.4 | 58.4 |
| 3 | 0.5 | 1.3 | 5~70 | 263 | 33.3 | 53.8 |
| 4 | 1.0 | 1.4 | 5~75 | 258 | 34.8 | 57.5 |
| 5 | 1.5 | 1.3 | 5~80 | 261 | 32.5 | 57.2 |
| 6 | 2.0 | 2.4 | 5~80 | 257 | 30.7 | 58.3 |
| 7 | 4.0 | 2.7 | 5~85 | 248 | 31.4 | 58.4 |
| 8 | 8.0 | 2.8 | 5~90 | 253 | 32.2 | 57.7 |
| 9 | 10.0 | 5.2 | 5~300 | 195 | 21.0 | 34.5 |
| 10 | 0.1 | 4.1 | 5~3000 | 173 | 20.8 | 31.8 |

Run No. 10 set forth in Table 12 is a comparative experiment wherein the vacuum de-bubbling step was omitted.

As will be seen from the results set forth in the Table, to the concrete of Run No. 9 is added the viscosity increasing agent in an amount somewhat larger than the defined range so that the concrete is de-bubbled insufficiently, leading to unsatisfactory development of strength; whereas in the concrete of Run No. 10 wherein the de-bubbled step is omitted, large size bubbles are entrained by the viscosity increasing agent to result in serious reduction in strengths.

EXAMPLE 12

Each of the polyethyleneoxides set forth in Table 13 was added, in a ratio of 1.0 part to 100 parts of cement, to a cement mortar composed of 33% of a cement and 67% of sand and having a water/cement ratio of 60%. Using a similar pilot plant as used in Example 1, each of the cement mortars added with respective polyethyleneoxide was de-bubbled while being mixed under agitation at 27.5 mmHg. The thus prepared cement mortar compositions were tested similarly to Example 1 to obtain the results shown in Table 13.

sitions were tested to obtain the results shown in Table 15.

TABLE 13

| Ex. 12 Run No. | Weight Average Molecular Weight (million) | Bubbles | | Strength | | |
|---|---|---|---|---|---|---|
| | | Air Content (%) | 98% Bubble Distribution Range (μ) | Compressive Strength (kg/cm$^2$) | Tensile Strength (kg/cm$^2$) | Bending Strength (kg/cm$^2$) |
| 1 | 0.10~0.15 | 1.3 | 5~45 | 215 | 28.7 | 47.5 |
| 2 | 0.50~0.70 | 1.5 | 5~55 | 207 | 31.6 | 46.8 |
| 3 | 0.50~0.70 | 1.4 | 5~70 | 218 | 29.3 | 42.3 |
| 4 | 1~1.7 | 1.8 | 5~80 | 223 | 30.1 | 45.7 |
| 5 | 1~1.7 | 1.7 | 5~110 | 205 | 32.2 | 44.3 |
| 6 | 1~1.7 | 1.9 | 5~100 | 212 | 29.4 | 47.5 |
| 7 | 3~4 | 2.3 | 5~80 | 208 | 31.4 | 46.2 |
| 8 | 4~5 | 2.1 | 5~80 | 215 | 30.3 | 48.7 |
| 9 | 8~10 | 3.8 | 5~1500 | 165 | 22.0 | 30.5 |

It will be seen that de-bubbling in Run No. 9 did not reach satisfactory level, since the weight average molecular weight used in the Run is too high to effect de-bubbling, leading to reduction in strengths.

EXAMPLE 13

A polyvinyl alcohol having a degree of hydrolysis of 97.5% and an average polymerization degree of 1700 to 2400, available under the Trade Name "PVA-CS" from Kurary Co., Ltd., was added as the viscosity increasing agent for controlling vacuum de-bubbling, the added quantity being changed in respective Runs as set forth in Table 14, to a concrete composition composed of 318 parts of a cement, 7 parts of a sodium melaminesulfonate base water-reducing agent, 763 parts of a fine aggregate and 1006 parts of a coarse aggregate and having a water/cement ratio of 40%. The thus prepared concrete compositions were subjected to tests similar to Example 1 to obtain the results as set forth in Table 14.

TABLE 14

| Ex. 13 Run No. | Quantity of Polyvinyl Alcohol Added to 100 Parts of Cement (parts) | Bubbles | | Strength | | |
|---|---|---|---|---|---|---|
| | | Air Content (%) | 98% Bubble Distribution Range (μ) | Compressive Strength (kg/cm$^2$) | Tensile Strength (kg/cm$^2$) | Bending Strength (kg/cm$^2$) |
| 1 | 0.001 | 1.4 | 5~40 | 364 | 35.3 | 53.5 |
| 2 | 0.1 | 2.3 | 5~70 | 358 | 36.5 | 52.4 |
| 3 | 0.5 | 2.7 | 5~70 | 355 | 34.3 | 54.2 |
| 4 | 1.0 | 2.7 | 5~65 | 351 | 35.8 | 53.3 |
| 5 | 1.5 | 3.3 | 5~70 | 352 | 34.3 | 54.6 |
| 6 | 2.0 | 2.9 | 5~65 | 343 | 36.6 | 51.5 |
| 7 | 4.0 | 3.2 | 5~70 | 348 | 36.1 | 50.3 |
| 8 | 8.0 | 3.1 | 5~80 | 345 | 36.7 | 47.5 |
| 9 | 10.0 | 4.6 | 5~1000 | 283 | 23.2 | 26.6 |

As will be seen from Table 14, de-bubbling in Run No. 9 did not reach satisfactory level, since the added quantity of the viscosity increasing agent is larger than the defined range to increase the viscosity of the concrete paste to an excessively higher level to result in insufficient de-bubbling.

EXAMPLE 14

Each of the modified polyvinyl alcohols set forth in Table 15 was added, in a ratio of 0.1 parts to 100 parts of cement, to a cement mortar composed of about 33% of a cement, about 66% of sand and 0.6% of a sodium melaminesulfonate base water-reducing agent and having a water/cement ratio of 40%. Using a similar plot plant as used in Example 1, each of the cement mortars was de-bubbled while being kneaded under agitation at 27.5 mmHg. The thus prepared cement mortar compo- Meantime, the letters (A) to (E) appearing in the column under the caption of "Modified Polyvinyl Alcohol" are those prepared, respectively, through the following processes:

(A) 50 parts of vinyl acetate and 1 part of dimethyl maleate were copolymerized by an ordinary solution polymerization method. The resultant vinyl acetate/dimethyl maleate copolymer was hydrolyzed to obtain a polyvinyl alcohol modified with carboxyl groups. The modified polyvinyl alcohol had an average polymerization degree of 1500, a degree of hydrolysis of 88.0 mol% and a content of maleic acid of 1.6 mol%.

(B) A polyvinyl alcohol having a polymerization degree of 1700 and a degree of hydrolysis of 97.5 mol% was reacted with chlorosulfonic acid in a pyridine medium to obtain a pyridine salt of sulfuric ester modified polyvinyl alcohol which was then neutralized to prepare a modified polyvinyl alcohol containing 0.5 mol% of sulfuric ester group.

(C) A polyvinyl alcohol having a polymerization degree of 2000 and a degree of hydrolysis of 88.0 mol% was reacted with 64% phosphoric acid in a benzene medium to obtain a modified polyvinyl alcohol having a polymerization degree of 1800, a degree of hydrolysis of 92 mol% and containing 2.3 mol% of phosphoric ester group.

(D) A mixture was prepared by mixing, in the equivalent ratio, the commercially available polyvinyl alcohol as described in Example 13 and the modified polyvinyl alcohol (A) as described above.

(E) Generally in accordance with the procedures as described for the preparation of the modified polyvinyl alcohol (A), another modified polyvinyl alcohol having an average polymerization degree of 3100 was prepared.

TABLE 15

| Ex. 14 Run No. | Modified Polyvinyl Alcohol | Bubbles Air Content (%) | 98% Bubble Distribution Range ($\mu$) | Strength Compressive Strength (kg/cm$^2$) | Tensile Strength (kg/cm$^2$) | Bending Strength (kg/cm$^2$) |
|---|---|---|---|---|---|---|
| 1 | A | 2.1 | 5~100 | 354 | 26.6 | 55.4 |
| 2 | A | 1.8 | 5~90 | 351 | 27.2 | 55.7 |
| 3 | B | 3.1 | 5~110 | 358 | 26.9 | 56.9 |
| 4 | B | 2.7 | 5~120 | 364 | 27.4 | 55.0 |
| 5 | C | 2.4 | 5~80 | 362 | 27.0 | 54.2 |
| 6 | C | 2.9 | 5~75 | 360 | 27.8 | 55.6 |
| 7 | D | 3.2 | 5~80 | 357 | 26.4 | 55.1 |
| 8 | D | 1.9 | 5~85 | 366 | 26.2 | 54.4 |
| 9 | E | 4.7 | 5~2000 | 273 | 20.3 | 35.0 |
| 10 | A | 7.3 | 5~2500 | 243 | 20.6 | 32.4 |

Run No. 10 in Table 15 was a comparative experiment wherein the vacuum de-bubbling step was omitted.

As will be seen from the Table, de-bubbling of cement mortar of Run No. 9 does not reach satisfactory level because of the use of a modified polyvinyl alcohol having an average polymerization degree higher than the defined range to some extent, and hence larger size bubbles are left to result in some reduction in strength. The result of Run No. 10 shows that the strengths are reduced significantly due to entrained large size bubbles by adding a viscosity increasing agent without a subsequent defoaming operation.

EXAMPLE 15

To 100 parts of a cement added was 2.0 parts of a vinyl acetate emulsion (available from Hoechst AG. under the Trade Name "Movinyl Powder-M-1") as the viscosity increasing agent for controlling the de-bubbling under vacuum. The viscosity increasing agent was added to a concrete composition composed of 330 parts of the cement, 620 parts of a fine aggregate and 1120 parts of a coarse aggregate and having a water/cement ratio of 50.0%.

The thus prepared concrete composition was tested generally in accordance with the procedures as described in Example 1 to obtain the results shown in the following Table 16.

TABLE 16

| Fine Bubbles Air Content (%) | 98% Bubble Distribution Range ($\mu$) | Strength Compressive Strength (kg/cm$^2$) | Tensile Strength (kg/cm$^2$) | Bending Strength (kg/cm$^2$) |
|---|---|---|---|---|
| 2.8 | 5 to 55 | 223 | 26.4 | 49.0 |

Although the invention has been described by referring to specific examples, it should be understood that the present invention is not limited only to the specific examples as herein disclosed, but it is intended to embrace all modifications and alternatives included in the broad scope of the invention as defined in the appended claims.

What is claimed is:

1. A process for placing a cement composition having high strength comprising the steps of: adding a viscosity increasing agent to a cement to prepare a cement composition containing said viscosity increasing agent; vacuum de-bubbling said cement composition containing said viscosity increasing agent under a reduced pressure to remove relatively large bubbles present in said cement composition and to leave therein only fine bubbles so that 98 vol% or more of the total sum volume of all of the bubbles left after the vaccum de-bubbling are composed of the sum volume of the bubbles each having foam size of not more than 120 microns; and then allowing the defoamed cement composition to be hardened.

2. The process according to claim 1, wherein said bubble size ranges within 25 to 100 microns.

3. The process according to claim 1, wherein adjacent bubbles are separated from one another by a distance of less than 1000 microns, and wherein the number of bubbles in the cement paste is within the range of from 50 to 8000 per cm$^3$.

4. The process according to claim 1, wherein said viscosity increasing agent is added to the cement in an amount of from 0.001 to 8 parts, by weight, based on 100 parts, by weight, of the cement.

5. The process according to claim 1, wherein said vacuum de-bubbling is effected at a pressure of from 600 mmHg to the vapor pressure of water.

6. The process according to claim 1, wherein said viscosity increasing agent is selected from the group consisting of carboxymethyl cellulose, other cellulose compounds, polyethyleneoxide, polyvinyl alcohol, synthetic resin emulsions and mixtures thereof.

7. The process according to claim 6, wherein said agent is a said other cellulose compound and has an average molecular weight of from 10,000 to 2,000,000 and is represented by the following general formula of:

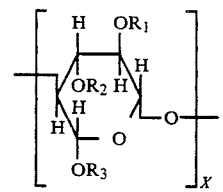

wherein R$_1$, R$_2$ and R$_3$ are the same or different groups and represented by the formula of (O—A$_1$)$_m$(O—A$_2$)-$_n$OA$_3$ where A$_1$ and A$_2$ are different groups and selected from ethylene and propylene groups, m and n ranging within 0 to 5, and A$_3$ is hydrogen or a lower alkyl group having 1 to 3 carbon atoms; and x is a positive number.

8. The process according to claim 7, wherein said other cellulose compound has the following general formula of:

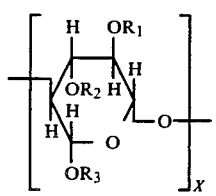

wherein $R_1$, $R_2$ and $R_3$ are the same or different groups selected from hydrogen and lower alkyl groups having 1 to 3 carbon atoms, and x is a positive number.

9. The process according to claim 7, wherein said agent is a said other cellulose compound has the following general formula of:

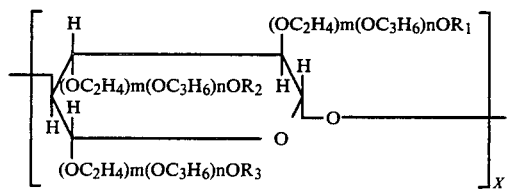

wherein m and n range within 0 to 5, with m, n affixed to at least one of the modifying oxyethylene-oxypropylene groups being 0.001 to 5; $R_1$, $R_2$ and $R_3$ are the same or different groups selected from hydrogen and lower alkyl groups having 1 to 3 carbon atoms; and x is a positive number.

10. The process according to claim 7, wherein said other cellulose compound has the following general formula of:

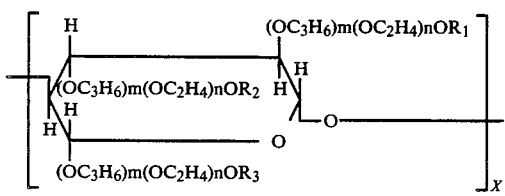

wherein m and n range within 0 to 5, with m, n affixed to at least one of the modifying oxypropylene-oxyethylene groups being 0.001 to 5; $R_1$, $R_2$ and $R_3$ are the same or different groups selected from hydrogen and lower alkyl groups having 1 to 3 carbon atoms; and x is a positive number.

11. The process according to claim 7, wherein said other cellulose compound has the following general formula of:

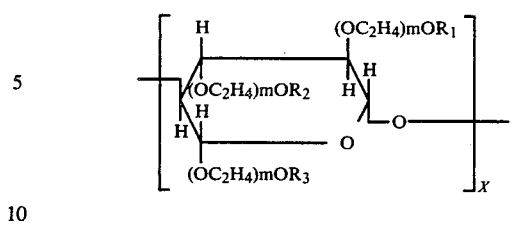

wherein m ranges within 0 to 5, with m affixed to at least one of the modifying oxyethylene groups being 0.001 to 5; $R_1$, $R_2$ and $R_3$ are the same or different groups selected from hydrogen and lower alkyl groups having 1 to 3 carbon atoms; and x is a positive number.

12. The process according to claim 7, wherein said other cellulose compound has the following general formula of:

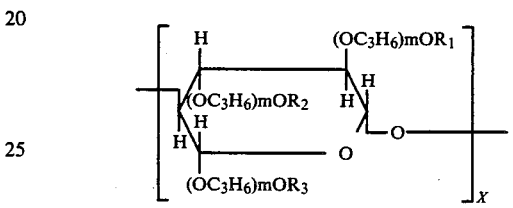

wherein m ranges within 0 to 5, with m affixed to at least one of the modifying oxypropylene groups being 0.001 to 5; $R_1$, $R_2$ and $R_3$ are the same or different groups selected from hydrogen and lower alkyl groups having 1 to 3 carbon atoms; and x is a positive number.

13. The process according to claim 6, wherein said agent is said carboxymethyl cellulose and has an average etherification degree of from 0.2 to 3.0 and represented by the following general formula of:

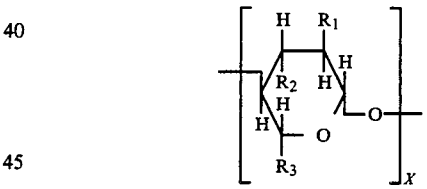

wherein $R_1$, $R_2$ and $R_3$ are hydroxyl group or —CH$_2$OCH$_2$COOM, at least one of $R_1$, $R_2$ and $R_3$ being —CH$_2$OCH$_2$COOM, where M is sodium, ammonium or calcium; and x is a positive number of 50 to 2,000.

14. The process according to claim 6, wherein said agent is said polyethyleneoxide and has an average molecular weight of from 100,000 to 5,000,000 and represented by the following general formula of: HOCH$_2$CH$_2$O—CH$_2$CH$_2$O]$_n$H wherein n is a positive number.

15. The process according to claim 6, wherein said agent is said polyvinyl alcohol and has an average hydrolysis degree of from 60 to 99 mol% and an average polymerization degree of from 200 to 3,000.

16. The process according to claim 6, wherein said synthetic resin emulsion is an emulsion of vinylacetate polymer.

17. The process according to claim 6, wherein said synthetic resin emulsion is an emulsion of vinyl acetate-vinyl versatic acid ester copolymer.

* * * * *

UNITED STATES PATENT AND TRADEMARK OFFICE
CERTIFICATE OF CORRECTION

PATENT NO.   : 4,585,486
DATED        : April 29, 1986
INVENTOR(S)  : Keiichi Fujita It is certified that error appears in the above-identified patent and that said Letters Patent are hereby corrected as shown below:

In the heading portion of the first page, add the following

Foreign Application Priority Data

| | | |
|---|---|---|
| July 22, 1983 | Japan | 58-132902 |
| July 22, 1983 | Japan | 58-132903 |
| July 23, 1983 | Japan | 58-133598 |
| August 25, 1983 | Japan | 58-154096 |
| August 25, 1983 | Japan | 58-154097 |
| August 31, 1983 | Japan | 58-157979 |

Signed and Sealed this

Fifth Day of August 1986

[SEAL]

Attest:

DONALD J. QUIGG

Attesting Officer

Commissioner of Patents and Trademarks